March 11, 1969  B. BERG  3,431,707
METHOD IN OPERATING CONDITIONING TOWERS FOR FURNACE FUMES
CONTAINING DUST TO BE RECOVERED BY MEANS OF
ELECTROSTATIC PRECIPITATORS
Filed April 5, 1967
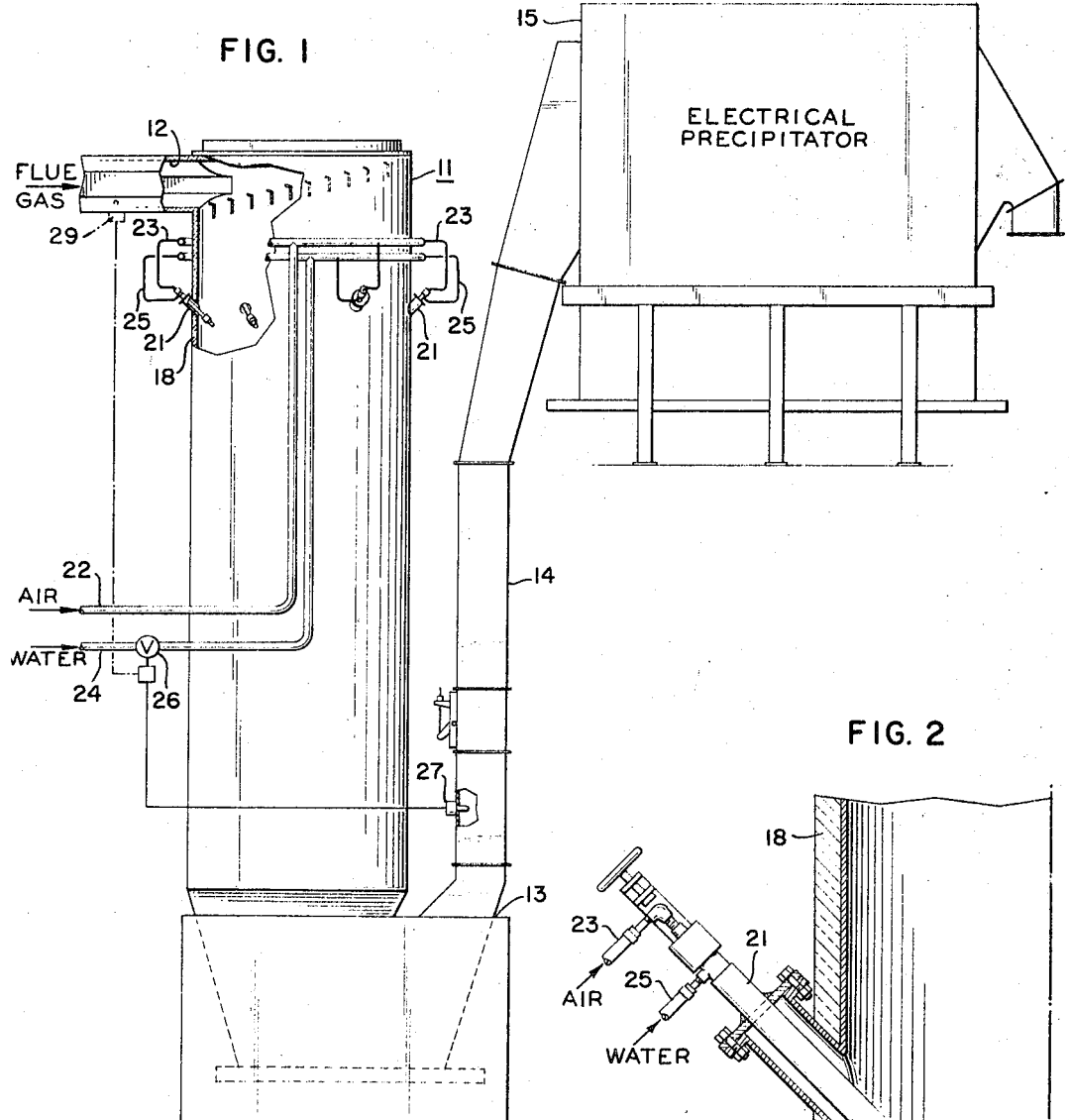
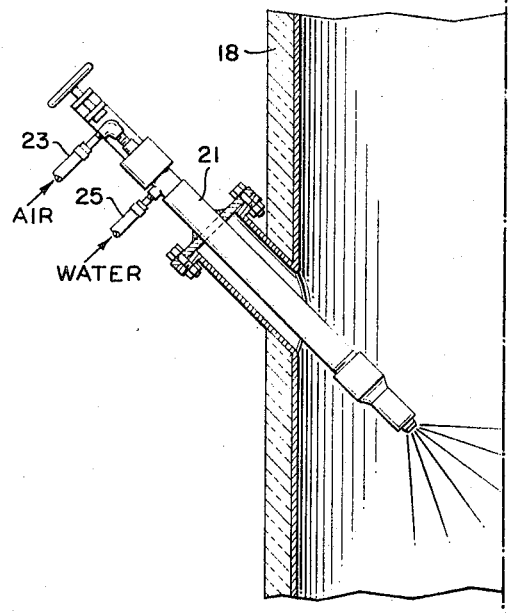
INVENTOR:
BENGT BERG
BY
Howson & Howson
ATTYS.

3,431,707
METHOD IN OPERATING CONDITIONING TOWERS FOR FURNACE FUMES CONTAINING DUST TO BE RECOVERED BY MEANS OF ELECTROSTATIC PRECIPITATORS
Bengt Berg, Nacka, Sweden, assignor to Aktiebolaget Svenska Flaktfabriken, Stockholm, Sweden
Filed Apr. 5, 1967, Ser. No. 628,666
Claims priority, application Sweden, Apr. 7, 1966, 4,841/66
U.S. Cl. 55—20    4 Claims
Int. Cl. B01d 47/06

ABSTRACT OF THE DISCLOSURE

A method for controlling the water spray in conditioning towers for dust-laden furnace fumes or flue gas so as to minimize the wetting of the tower walls by the moistened dust when the load, i.e., the quantity and temperature of the flowing fumes, varies. At decreased loads, the spray is regulated to provide smaller droplets injected at higher speeds so as to provide a shorter evaporation path at a lower gas speed. The method uses a separate gaseous atomizing medium, such as compressed air, into which the water is fed to produce a spray in the tower, and when the load is reduced, the atomizing medium is maintained constant while the water injection is reduced. The reduction in load is sensed by the wet bulb temperature in the outlet and/or inlet of the conditioning tower.

---

In chemical processes of the type where the fumes from furnaces include dust as a condensation product with a very small grain size, electrostatic precipitators are in many cases advantageously utilized for separating the dust. In highly resistive dusts the operation of the electrostatic precipitator is considerably facilitated when the water vapour content in the fumes can be increased. This has an effect on the dielectric properties of the gas as well as on the dust properties, because the dust absorbs water, for example by the hygroscopity of the dust. The increase of the moisture content in the dust, though being very small, in many cases some tenth of a percent, may nevertheless change the resistivity of the dust and its mechanical properties to a considerable degree.

For said conditioning of the fumes usually special conditioning towers are employed into which the gas is introduced from one end of the tower and removed at its other end, at the same time as water is injected in atomized state at the end where the fumes are introduced. It is desirable to inject the water in such a manner that the fumes and the water droplets are intimately intermixed, with the exception of the boundary layers which will be in contact with the walls of the tower. In said boundary layers it may be desirable to maintain the water content in the fumes at a low level, in order to prevent the dust which adheres on the walls from being moistened and thereby to be given a stronger adhesive power and an increased tendency of building up hard deposits.

Usually—at least in discontinuous processes—the gas quantity and temperature are not constant, but they vary, so that the water quantity required for a suitable conditioning must be controlled. Furthermore, the flow pattern in the tower will change to a change of the gas speed in the inlet. The wetting boundary, i.e. the place on the tower walls where the water droplets are precipitated or water vapour condenses out into the dust, will be moved upwards at a decrease in the gas speed, if not special steps are taken which are the subject of this invention. A theoretical solution would be, for example by an (iris-) diaphragm construction to make the inlet area variable or to choose a tower having variable dimensions with respect to length and diameter.

When the gas has passed through the inlet connection, the flow is substantially characterized in that the jet spreads and the angle of spreading increases with the decrease in speed, so that the distance between the inlet connection and the place where the gas jet entirely fills the tower decreases with decreasing speed. Therefore, the risk of wetting the tower walls will be greatest at at low inlet speed and smaller at a high inlet speed. By the combination of the tower dimensions, the spreading angle and the gas speed, thus, the stay time of a gas element in the jet from the inlet opening to the place where the jet strikes the wall, will decrease somewhat with decreasing inlet speed, i.e. with reducing load.

The invention is based on the insight that a wetting of the tower walls can be avoided when the water droplets supplied to the fumes are given a shorter evaporation path at lower gas speed. The shortening of the evaporation path is obtained in that the diameter of the water droplets is reduced and the speed in relation to the gas is increased. As a result of the diameter reduction the relation between evaporation surface and droplet mass increases. Besides, due to a smaller hydraulic diameter and increased speed the coefficient of heat transfer will be higher. For obtaining the smaller diameter and the higher relative speed of the water in relation to the gas, a greater energy is required for the atomization, which energy is obtained by maintaining the air pressure constant also at a reduced water amount.

It applies generally to all known nozzles for water supply with atomization, that the size of the droplets depends on the specific energy amount which is used for atomizing the water. At hydraulic water nozzles, therefore, the droplet size shows a clear tendency of increasing at decreasing pressure, i.e. at a reduced liquid flow through the nozzle. For partial loads, i.e. for a reduced gas quantity, for which according to the above discussion a shorter evaporation path is required, this type of nozzle, therefore, is highly unfavourable. For nozzles where the atomization of the water is effected by the aid of compressed air, another gas or steam, usually greater specific energy amounts can be applied for the atomization than for hydraulic water nozzles. In most cases a certain constant pressure difference between the water and the atomizing medium is utilized over the entire capacity register of the nozzle, which results in a saving of energy consumption for the atomizing medium at the same time as the droplet size is maintained substantially constant.

The invention has as its object to maintain a constant pressure of the atomizing medium. Hereby the quantity of said medium will increase—but relatively insignificantly—with decreasing water quantity, which depends on a decrease in the pressure drop in the mixing part whereby the pressure at the slightly throttled nozzle for the air supply increases. The specific atomizing energy i.e. the energy amount in the atomizing medium per unit of water quantity supplied, increases distinctly progressively with decreasing water quantity. This results according to the invention at a decreased load in a substantially smaller droplet size and a higher speed of the water droplets relative the fumes than in the previously mentioned application method for such nozzles, and this relation renders it possible at a decreased gas speed in the conditioning tower substantially to shorten the evaporation path, whereby wetting of the walls is avoided. By maintaining a constant air pressure at the nozzles for atomizing the water also is gained that the spreading pattern for the water in the geometric space—constituted by the tower—is maintained constant, so that deflection tendencies of the gas jet which may be more accentuated at a low load, are counteracted by the actual energy of the water and the atomizing medium. The adjustment of the conditioning degree of the fumes to a constant value adjusted to the operation conditions can be made very simply by the system now discolsed, in that the water supply is governed by a control device sensing the temperature of the fumes going off, without any need of the water quantity to influence on or be influenced by the quantity of atomizing medium. This simplification of the control automatics per se pays more than well for the power consumption for the atomizing medium which in spite of the varying load is maintained constant, compared with the reduction in power consumption which could be obtained by conventional control methods. These expense factors, however, are of a subordinated importance, while the safety obtained by the invention against interruptions due to the wetting of the tower wall is of a very great economic importance.

*Description of the drawing*

Apparatus for performing the method of the present invention is illustrated in the attached drawing wherein:

FIG. 1 is a view in side elevation with a portion broken away illustrating a conditioning tower and electrical precipitator for treating dust-laden furnace fumes or flue gas in accordance with the present invention; and FIG. 2 is an enlarged fragmentary sectional view of the conditioning tower showing the nozzles for injecting atomized water thereinto.

Referring to the drawing, a conditioning tower 11 has an inlet 12 at one end for receiving the furnace fumes or flue gas. The gas is discharged from the other end of the conditioning tower 11 as indicated at 13, and is conducted by a duct 14 to an electrical precipitator 15. Within the wall 18 of the condition-tower 11, adjacent the inlet 12, a plurality of injector nozzles 21 are mounted in spaced relation about the periphery. The nozzles 21 inject water in an atomized state into the gas flowing through the conditioning tower to increase the moisture content of the dust.

In accordance with the present invention, the water is atomized by a separate gaseous atomizing medium, such as compressed air, introduced into the nozzles 21 from a supply line 22 through suitable branch lines 23. Water is injected into the atomizing medium under pressure from a supply line 24 and branch lines 25. As stated above, the pressure and flow of the atomizing medium is maintained constant and the water injection is reduced when the flow of flue gas is reduced. To this end, a pressure reducing valve 26 is provided in the supply line 24, and is connected to a sensing device 27 mounted in the outlet of the tower to sense the wet bulb temperature of the discharged gas. If desired, an additional sensing means 29 may be provided at the inlet 12 to provide an impulse for operating the valve 26.

Thus, the illustrated apparatus permits regulation of the spray from the nozzle 21 in response to the flow of furnace fumes through the tower 11 by maintaining the pressure of the atomizing medium in the branch 23 constant and adjusting the injecting pressure of the water in the branch 25.

I claim:

1. A method in operating conditioning towers for furnace fumes containing dust to be recovered by means of electrostatic precipitators, which conditioning towers are equipped with water spray nozzles of the type where the atomization of the water is effected by injecting water into an atomizing medium such as compressed air, compressed gas or steam; characterized in that the spray is regulated by sensing the temperature of the flowing fumes in response to changes in the flow of furnace fumes through the tower by maintaining the pressure of the atomizing medium constant, and adjusting only the injecting pressure of the water into the nozzle for adjusting the desired conditioning of the fumes.

2. A method according to claim 1 wherein the injecting pressure of the water is reduced as the flow of furnace fumes is reduced.

3. A method according to claim 1 characterized in that the water pressure is controlled by sensing the temperature of the flowing fumes in the outlet and/or the inlet of the conditioning tower.

4. A method according to claim 3 characterized in that the temperature of the flowing fumes which is sensed is the wet bulb temperature.

References Cited

UNITED STATES PATENTS

| | | | |
|---|---|---|---|
| 2,561,441 | 7/1951 | Lou | 55—163 |
| 2,935,375 | 5/1960 | Boucher | 55—84 |
| 3,183,645 | 5/1965 | Teller | 55—20 |
| 3,362,132 | 1/1968 | Schellenberg | 55—163 |

REUBEN FRIEDMAN, *Primary Examiner.*

CHARLES N. HART, *Assistant Examiner.*